Aug. 4, 1970　　　　　　　H. TORNHEIM　　　　　　3,522,894
TRUCK
Filed Aug. 1, 1968　　　　　　　　　　　　　　4 Sheets-Sheet 2
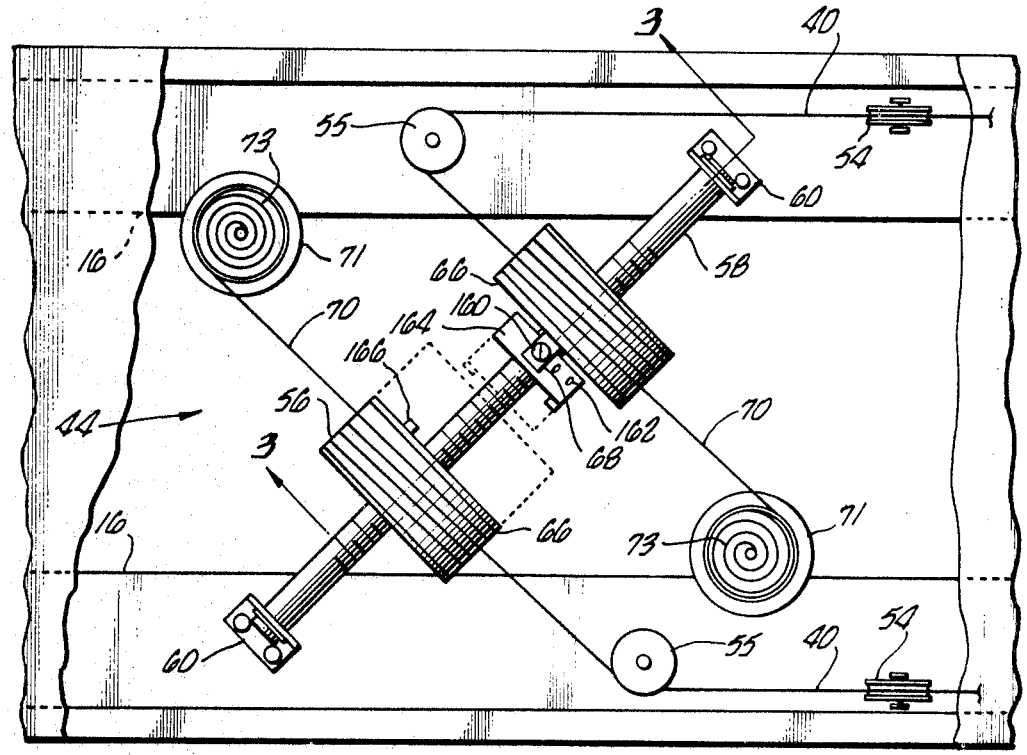
FIG_2_
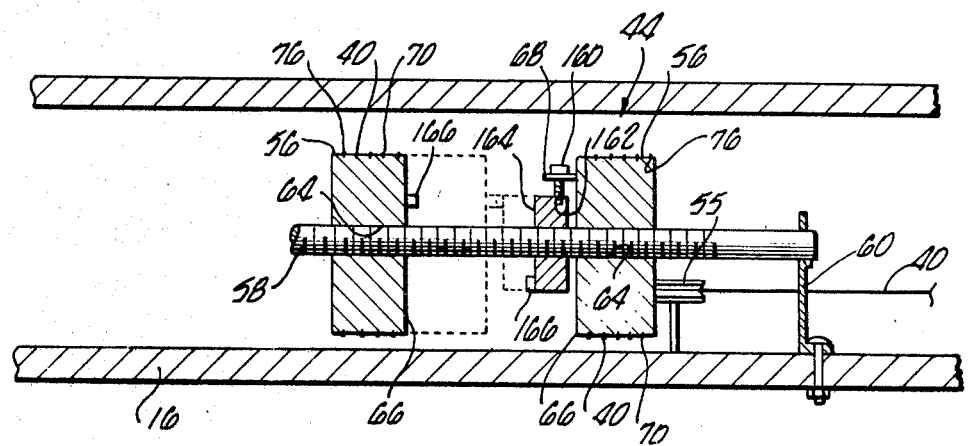
FIG_3_
INVENTOR.
HAROLD TORNHEIM
BY
Christie, Parker & Hale
ATTORNEYS

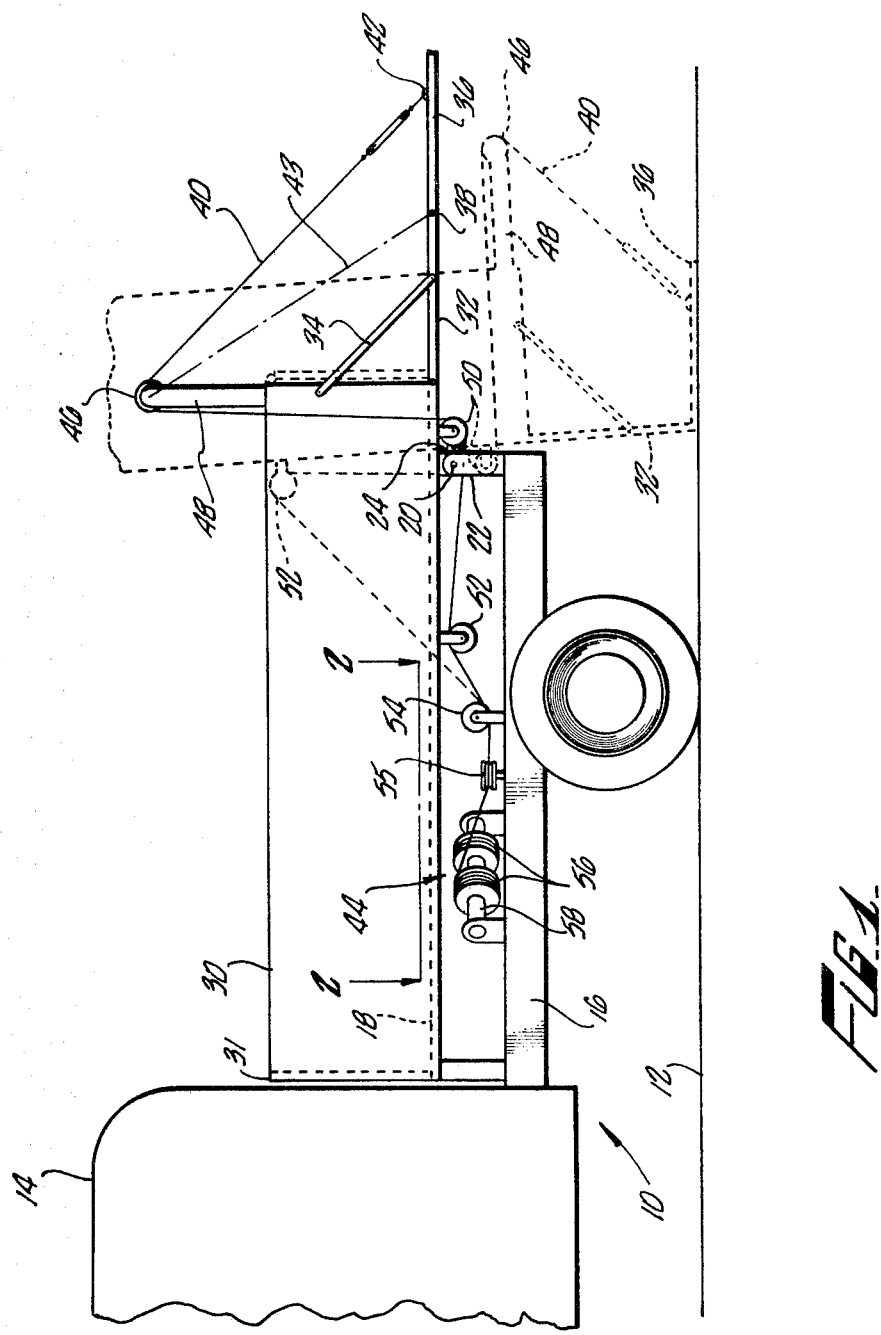

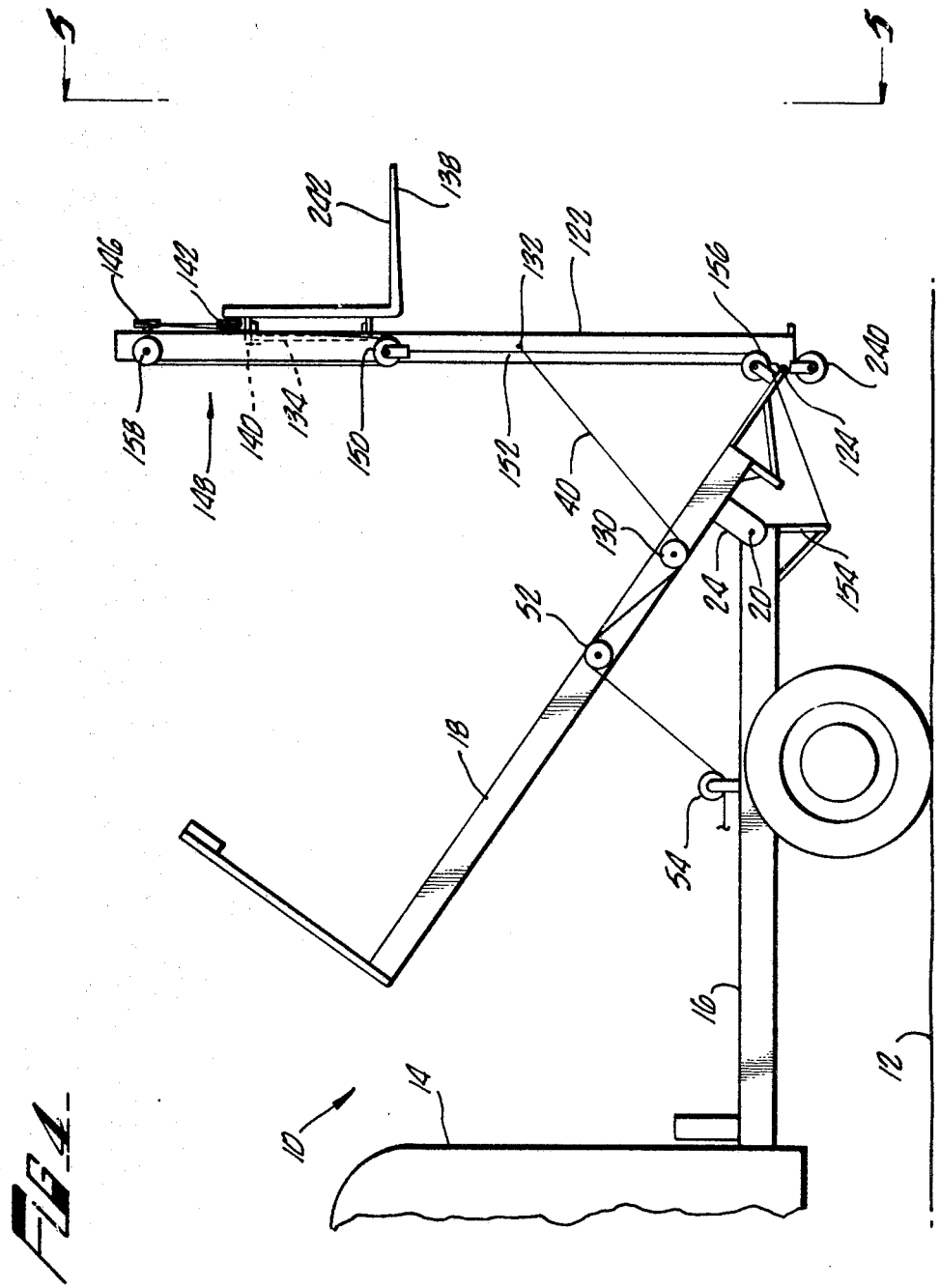

INVENTOR.
HAROLD TORNHEIM

United States Patent Office 3,522,894
Patented Aug. 4, 1970

3,522,894
TRUCK
Harold Tornheim, 430 N. Auburn Ave.,
Sierra Madre, Calif. 91024
Filed Aug. 1, 1968, Ser. No. 749,358
Int. Cl. B60p 1/14, 1/44
U.S. Cl. 214—501                          12 Claims

ABSTRACT OF THE DISCLOSURE

A platform pivoted to the rear of the body of a lift-bed truck loads and unloads objects. A pair of tension lines connects the platform to two rotatable drums, secured to the chassis of the truck, for maintaining the platform in a horizontal position as the truck bed rises to an inclined position. Objects placed on the platform rise to the level of the truck bed as it returns to a horizontal position. The drums maintain the tension lines taut in all positions of the truck bed, tailgate, and platform. A forklift attachment can similarly mount on the truck bed for lifting and supporting a variety of objects.

BACKGROUND OF THE INVENTION

Field of the invention

This invention relates to a lift-bed truck and, more particularly, to a truck having a truck bed that can incline steeply and that has a pivotable platform for permitting simplified loading and unloading of the truck.

State of the prior art

A pickup truck is a versatile vehicle, which numerous commercial organizations as well as private individuals employ. It can be adapted for carrying miscellaneous objects of freight that fit the truck bed and are within its load capacity. For example, private individuals commonly mount a camper on the truck bed. In other cases, the vehicle has a rack extending over the cab for carrying long objects of freight, such as ladders, planks, and lengths of pipe.

A serious obstacle to a full exploitation of the truck's versatility is the difficulty of loading and unloading heavy objects of freight between ground and the truck bed. Without a tailgate lift, one man alone cannot load and unload heavy freight. Pushing the freight up a ramp of planks is difficult, physically exhausting, and in many cases impossible because of the weight of the objects being handled.

A conventional tailgate lift is a permanent and expensive accessory. In many cases, it usurps the spare tire's storage space. It may make the mounting of a camper impossible. The inherent versatility of the truck is therefore of meagre benefit.

A conventional lift-bed truck is in wide use as a dump truck, which can unload bulk material easily and economically by dumping. A truck of this type, however, is of minimal value in conjunction with material not to be dumped. It is not possible to use the lift-bed feature of the truck for loading the material.

SUMMARY OF THE INVENTION

This invention employs a hoisting member pivotally connected to the lift-bed of a truck, together with its actuating mechanism, for the hoisting and lowering of material. Tension lines connect the hoisting member to the truck chassis. Hoisting or lowering results when the truck bed is inclined by the actuating mechanism.

An especially preferred hoisting member comprises a lifting platform pivotally secured to the rear portion of the truck bed. The actuating means pivots the truck bed from a horizontal position parallel the chassis into an inclined position, and vice versa. A pair of tension lines connects the lifting platform to the chassis and maintains the lifting platform in a horizontal position irrespective of the angular inclination of the truck bed. Means for guiding the tension lines along the truck bed and chassis are also provided.

The lifting platform is preferably secured to the tailgate of a truck bed. It enables the loading of material by providing a horizontal surface positioned adjacent the ground when the truck bed is in an inclined position. After the load has been placed on the platform, the truck bed pivots into its horizontal position such that the load on the platform rises to the elevation of the now horizontal truck bed. In this position, the truck bed, tailgate, and lifting platform are coplanar, and the load can be moved in a horizontal direction onto the truck bed.

An adjusting means can be utilized with the lifting platform to maintain the tension lines taut in all position of the truck bed, the tailgate, and the platform. Thus, the tailgate pivots into a closed position such that it is vertical relative to the truck bed, and the platform is positioned adjacent and parallel to the tailgate. A freed length of tension line is taken up by the adjusting means such that the lines remain taut and do not hang loosely about the truck. If the tension lines are not maintained taut, they can become disengaged from pulleys or other guide means and may impair the proper functioning of the apparatus. When the platform is extended to receive a load, the adjusting means automatically runs out a sufficient length of tension line to maintain the platform in a horizontal position. At that position, the adjusting is locked to prevent additional tension line from being payed out, which would cause the platform to pivot into a nonhorizontal position.

An alternate preferred hoisting member of this invention is a forklift attachment for hoisting loads off the ground and stacking them on top of one another, or for carrying loads over short distances. The forklift attachment comprises a fork mounted on a dolly at the rear of the truck bed. The dolly engages upright posts that are pivotally secured to the truck bed. Tension lines connect the dolly with the truck chassis such that the dolly and fork move in a vertical direction when the truck is inclined.

The hoisting member of this invention can be employed to perform a variety of operations, such as lifting, lowering, loading and unloading. There is no need for special auxiliary equipment or difficult and time-consuming manual operations. Thus, the apparatus represents a significant advance over conventional lift-bed trucks or other available equipment of this type.

BRIEF DESCRIPTION OF THE DRAWINGS

FIG. 1 is a fragmentary side elevational view of a lift-bed truck provided with a horizontal platform pivotally secured to a tailgate of the truck;

FIG. 2 is a fragmentary top view taken, with parts broken away, along lines 2—2 of FIG. 1;

FIG. 3 is a cross-sectional elevational view taken along lines 3—3 of FIG. 2;

FIG. 4 is a fragmentary side elevational view of a lift-bed truck provided with lift forks constructed according to this invention.

DESCRIPTION OF THE PREFERRED EMBODIMENTS

Figure 5:
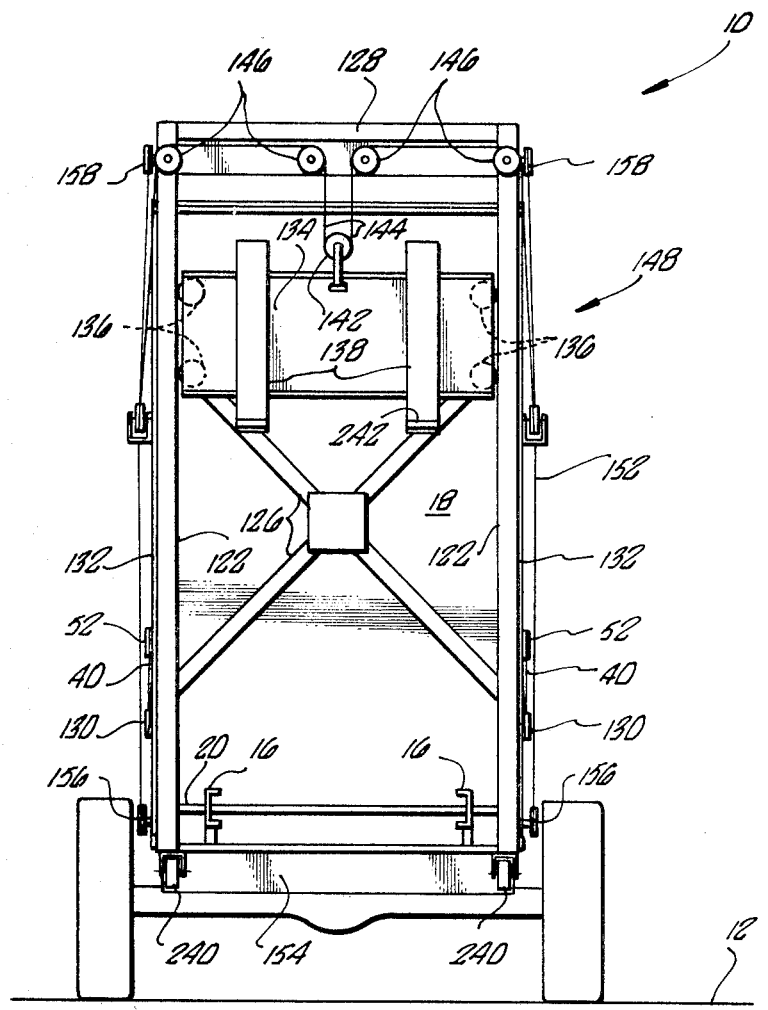
FIG. 5 is a rear elevational view taken along lines 5—5 of FIG. 4.

FIG. 1 shows a conventional lift- or tilting-bed truck 10 parked on a ground 12. The truck has a driver's cab 14 adjacent its front end and a chassis 16 extending from the cab toward the truck's rear end. A chassis pivot pin 20 pivotally secures a truck bed 18, for carrying freight, to the chassis. The pin engages brackets 22 and 24 mounted on the chassis and the truck bed, respectively. A hydraulic cylinder (not shown), pivotally secured at one of its two ends to the chassis and at its other end to the truck bed, inclines the truck bed about the chassis pivot pin 20 into a position inclined from the horizontal. Phantom lines in FIG. 1 show this inclined position. Hydraulic lines (not shown) energize the hydraulic cylinder.

A double-acting type of hydraulic cylinder may be necessary if gravity alone cannot return the truck bed into its horizontal position. The truck bed can thereby be tilted into a substantially vertical position and it can be positively returned to its horizontal position without having to rely on gravity. Alternately, a mechanical actuator such as a screw drive (not shown) may replace the hydraulic cylinder.

The truck bed, a type standard for many trucks, has a pair of side walls 30, a front wall 31, and a tailgate 32. The tailgate is of the type standard on fixed-bed trucks, the type of tailgate that pivots at the floor of the truck bed, and not of the type standard on dump trucks. Instead of a pair of chains or steel cables that supports the open tailgate in a standard fixed-bed truck, this invention uses a pair of bars 34. Chains or cables are not suitable because in a steeply inclined position of the truck bed, gravity is not enough to maintain the tailgate fully open, coplanar with the truck bed.

A substantially rectangular platform 36 pivots to the rear end of the tailgate at a platform pivot pin 38. The platform extends rearwardly from the tailgate whenever the tailgate is open. (The platform hangs vertically and inoperatively whenever the tailgate is closed.)

A pair of tension lines 40, constructed of steel cable or chain, extends from the platform to an adjusting means 44 mounted on the chassis. One end of each tension line fastens to the platform at one of a pair of eyebolt plates 42. The other end of each tension line fastens to the adjusting means. Between the two ends of each tension line are pulleys, also arranged in pairs, to guide it. The pairs of pulleys arranged in order along the tension lines, starting from the eyebolt plates 42, are as follows:

(a) Top sheaves 46, on a pair of upright posts 48 at the rear end of the truck bed;
(b) First guide pulleys 50, at the rear end of the underside of the truck bed;
(c) Second guide pulleys 52, more forward than the first guide pulleys 50, but still on the underside of the truck bed;
(d) Third guide pulleys 54, on the chassis;
(e) Fourth guide pulleys 55, on the chassis just before the adjusting means 44.

From the second guide pulleys 52 the tension lines are guided towards and into engagement with the adjusting means 44 secured to the chassis 16. Preferably, pairs of serially arranged third pulleys 54 are disposed intermediate the second pulleys and the adjusting means to properly guide and position the tension lines relative to the adjusting means.

In order to understand how the platform 36 remains horizontal irrespective of its height from the ground 12 to the level of the horizontal truck bed 18, let us consider the dynamic geometry of two triangles. The three angles of the first triangle are at the platform pivot pin 38, the eyebolt plate 42, and the top sheave 46. Two sides of the triangle have fixed lengths: one is the platform 36 from the platform pivot pin 38 to the eyebolt plate 42, and the other is the dot-and-dashed construction line 43 from the top sheave 46 to the platform pivot pin 38. The third side, consisting of a length of the tension line from the top sheave 46 to the eyebolt plate 42, varies in length.

The three angles of the second triangle are at the chassis pivot pin 20, at the second guide pulley 52, on the truck bed, and at the third guide pulley 54, on the chassis. Again, two sides have fixed lengths: one is along the truck bed from the chassis pivot pin 20 to the second guide pulley 52, and the other is along the chassis from the chassis pivot pin 20 to the third guide pulley 54. Again, the third side, consisting of a length of the tension line, from the second guide pulley 52 to the third guide pulley 54, varies in length. Furthermore, let us at first consider the adjusting means 44 static, that is, that the tension line from the adjusting means to the third guide pulley is motionless.

In this circumstance, the sum of the lengths of the tension line in the two triangles is a constant; if one triangle takes more of the tension line, it must take it away from the other triangle. If the truck inclines from the horizontal position, the second triangle requires more of the tension line. The second triangle takes it away from the first triangle, so that the top sheave 46 must approach the eyebolt plate 42. In a proper design, the rate of approach maintains the platform horizontal.

The platform is absolutely horizontal only at a few isolated points in its travel. But it takes a spirit level to detect the deviation from absolute horizontality at all points in the travel. Since the purpose of the platform is the loading and unloading of freight, the platform is practically horizontal.

The guide pulleys that do not form angles of the two triangles are unessential to the theory of the operation of the tailgate lift. There may be more pulleys, or some of those already described may be absent. Their presence depends on the specific design in a particular truck using the invention.

The pulleys shown in FIG. 1 are fixed sheaves. Of course, swivel blocks or blocks each on a shackle (not shown) can replace them in order to assure their alignment with the tension line as the truck bed inclines.

The described embodiment is the preferred one because it conforms basically to a conventional dump truck. An alternate embodiment converts the platform into the truck's tailgate. This conversion eliminates the former tailgate 32 and the bars 34, and the side walls 30 consequently extend to the platform pivot pin 38.

If the tailgate is closed, as the phantom lines of FIG. 1 show, the platform pivots about the platform pivot pin 38 into a vertical position substantially parallel to and adjacent the tailgate. In this position, the distance between the top sheave 46 and the eyebolt plate 42 is substantially less than that in the open position of the tailgate. The tension lines are therefore loose, and they may become entangled or disengaged from the guide pulleys. A purpose of the adjusting means 44 is to take up the length of the tension lines that is free whenever the tailgate is closed. The adjusting means is not an essential. It is possible, for example, after the tailgate is closed, to pull on the tension lines at the eyebolt plate 42 in order to take up slack, then to demount the tension lines from the eyebolt plates, and finally to secure the tension lines suitably to the upright posts 48.

FIGS. 2 and 3 show the adjusting means. Two cylindrical drums 56 mount coaxially on a threaded shaft 58 secured at its ends to the chassis 16 by means of mounting brackets 60. The shaft engages correspondingly threaded aperture 64 in each drum, so that the drums are free to rotate about the shaft. As the drums rotate on the thread, they move axially as well. On the face 66 of one of the drums that faces the other drum is a lug 68 that is radially offset from the center of the drum and that extends axially towards the other drum. The lug includes a threaded bolt 160 with a radially aligned axis and an inner end in engagement with an aperture 162 in the periphery of an adjusting cylinder 164. While the bolt engages an aperture, the drum and the adjusting cylinder are locked together.

Engaging the bolt 160 in another aperture 162 varies the axial distance between the drum and the adjusting cylinder. The adjusting cylinder also has a mating thread that engages the threads of the shaft 56. The thread in the adjusting cylinder adds nothing to the functioning of the locked drum and adjusting cylinder. The purpose of the thread is to aid in making the change in axial distance. The drum without the lug 68 has a dog 166, and the adjusting cylinder likewise has a dog 166, both dogs projecting toward each other. The arrangement of the dogs is such that they engage each other if the drum and the adjusting cylinder are sufficiently close to each other. Upon their engagement, both drums and the adjusting cylinder are locked to each other, and they must rotate together.

The periphery of each drum has a helical groove 76 to engage and guide one of the tension lines 40. A suitable means, such as a clamp (not shown) secures the end of the tension line at the end of the drum facing the mounting bracket 60. The tension lines wind around the drums in like directions; that is, both tension lines wind around the periphery of the drum in either a left-handed or right-handed manner depending on whether the shaft 58 has a right-handed or left-handed thread. The pitch of the groove in the drum is preferably the same as that of the thread on the shaft so as to maintain the course of the tension line 40 fixed between the fourth guide pulley 55 and the drum. This fixed course confines the tension line to pass through a small hole in a dust cover (not shown) for the adjusting means. The tension lines extend away from the respective drums in opposing directions, as FIG. 2 shows. A force on one of the tension lines 40 imparts a torque on its associated drum, which rotates it about the shaft. The drum at the same time also moves axially along the shaft toward the other drum.

Wound in a portion of the groove in each drum unoccupied by the tension line is one of a pair of spring leaders 70, consisting of a light wire cable or chain. One end of the spring leader fastens to the drum in the same manner as the tension line fastens, but at the other end of the drum. Consequently, as the drum rotates and reels in the tension line, it pays out the spring leader at the same rate. Conversely, the drum pays out the tension line at the same rate as it reels in the spring leader. Consequently, the tension line and the spring leader cannot interfere with each other.

The other end of the spring leader fastens to one of a pair of spools 71 each with its spiral retractable spring 73. The spring leader fastens in such a way as to wind around the spool. The mechanism of the spool 71 and the spring 73 is common in other devices, such as an automatically retractable clothes line, or an automatically retractable key chain, or an automatically retractable tape measure, or a balancer in a double hung window sash.

The spools 71 with their springs 73 fasten to the chassis 16 at fixed locations in proper physical relation to the adjusting means. The spring leader 70 has a fixed course between the drum and the spool for the same reason that the tension line has a fixed course between the drum and the fourth guide pulley.

It is obvious that in an alternate construction, the tension line could replace the spring leader and wind directly in the spool after the tension line has wound a few turns around the drum. Slippage of the tension line on the drum and a large capacity spool to accommodate the necessarily large diameter of the tension line make this alternate a secondary choice.

The spring leader 70 imparts biasing torque on the drum, which opposes a torque also imparted on the drum by the tension line 40 under tension. The spring leaders impart sufficient biasing torque on the drums to maintain the tension lines taut. The springs 73 should not be oversized because they could in that case affect the operation of the tension lines and the platform 36. For example, oversized springs could pivot the platform and the tailgate 32 into a closed position. If the tailgate opens, the distance between the eyebolt plate 42 and the top sheave 46 increases until the platform, the tailgate, and the truck bed 18 are simultaneously in a horizontal position. As the tailgate opens, the weight of the platform subjects each tension line 40 to a force, which is transmitted through the tension line to the periphery of each drum. This force rotates the drums about the shaft 58 in opposing directions against the biasing torque of the spring leaders while the drums move axially towards each other. The arrangement of the drums is such that the dogs 166 engage each other after a critical amount of the tension line runs out to set the platform coplanar with the truck bed and the tailgate if the truck bed is parallel to the chassis 16. The correct adjustment, made by lengthening or shortening the tension lines between the adjusting means and the eyebolt plates, occurs when the adjusting means is first installed on the truck. A turnbuckle at the eyebolt plate allows for an occasional correction in the length of the tension line as the tension line ages.

Thereafter, each time the tailgate 32 is lowered, the weight of the platform 36 causes the drum to release a critical amount, and no more, of the tension line to set the platform horizontally. The horizontal position of the platform is assured irrespective of the angular position of the truck bed relative to the chassis since any difference in the distance between the top sheave 46 and the eyebolt plate 42 due to an angular inclination of the truck bed is compensated for by the displacement of the second guide pulley 52 relative to the third guide pulley 54. Each time the tailgate is closed, the biasing torque of the springs 73 rotates the drums to take up any slack in the tension lines 40 and to maintain them taut.

The purpose of the adjusting cylinder now becomes evident. If there are other attachments to the truck, such as the forklift attachment described later, that require different lengths of the tension lines, the multiple apertures 162 in the adjusting cylinder allow for a selection of lengths by limiting the travel between the drums before the dogs 166 engage. If there is no need for different lengths of the tension lines, the adjusting cylinder is superfluous, and it may be absent. In that case, both drums are alike; each has a dog 166 that engages the other.

Aside from maintaining the tension lines 40 taut, the adjusting means acts as a tension equalizer. If a load is eccentrically placed on the platform 36 and one of the pair of tension lines carries substantially more weight than the other, that tension line lengthens, the other shortens, and the platform twists imperceptibly in the process of distributing the load between the two tension lines equally. The adjusting means thereby reduces the maximum possible stress to half. The respective lengthening and shortening of the tension lines takes place while the dogs 166 are engaged. A greater load on one tension line rotates the locked-together drums 56 about the shaft 58 until the forces in the two tension lines are equal. Rotation of the drums as a unit pays out lengths of one of the tension lines at the same rate that it reels in the other. The actual movement is barely perceptible.

Note that any suitable adjusting means can equalize the tension lines or maintain them taut. For example, a cross beam (not shown) pivoted to the chassis 16 of the truck can equalize the tension lines. The ends of the tension lines 40 connect to the ends of the beam. If the forces on the tension lines becomes unequal, the cross beam pivots about its center until the forces become equal. The beam may include means secured to its ends for reeling in slack in the tension lines. Constructing the two tension lines as a single unit guided over a pulley arrangement also equalizes the forces.

Another preferred embodiment of this invention, a forklift attachment 120, appears in FIGS. 4 and 5. The forklift attachment includes a pair of laterally spaced elongated tracks 122 that pivot to the truck bed's rear end by means of a forklift pivot pin 124. During lifting operations, the tracks 122 assume a vertical position. The tracks are preferably U-shaped channels having their flanges facing each other. A pair of cross members 126 and a transverse beam 128 across the top of the tracks secure the pair of tracks to each other. The forklift attachment uses the pair of tension lines 40 also shown in FIG. 1. The tension line runs over the second guide pulley 52 and the third guide pulley 54, respectively secured to the truck bed and the truck chassis 16, and over an additional guide pulley 130. The tension line's free end fastens to the truck 122 at a point 132. The tension lines and guide pulleys maintain the tracks 122 in a vertical position during inclination of the truck bed 18.

The forklift attachment 120 includes a dolly 134 provided with pairs of guide wheels 136 adjacent each end of the dolly and in engagement with the tracks 122. Preferably, a wide channel constitutes the dolly. The channel carries a pair of forks 138. The forks are freely translatable between the center of the dolly and its outer ends adjacent the tracks 122. Holding brackets 140, reaching over and behind the beam of the dolly, best seen in FIG. 4, prevent the forks from disengaging from the dolly.

The upper flange of the channel defining the dolly 134 has an equalizing pulley 142, which is centered between the tracks 122 and engages parallel strings of upwardly extending hoist lines 144. Pairs of pulleys 146 mounted adjacent the transverse beam 128 guide the hoist lines first upwards and then parallel and adjacent to the tracks 122 in a direction towards the forklift pivot pin 124. Each hoist line ends by becoming the falls in one of a pair of block and tackle arrangements 148, each comprising also a running block 150 and a fall block 158. One end of a pair of lift lines 152 fastens to the axle (not shown) of the running block 150, and the other end of the lift line fastens to a support 154 mounted on the chassis 16 of the truck. A pulley 156, one of a pair mounted near the folklift pivot pin 124, guides the lift line 152. Whenever the truck bed is in its most steeply inclined position, the distance between the fall block 158 of the block and tackle arrangement 148 and the support 154 is at a minimum. In this case, the block and tackle arrangement frees a length of the hoist line 144 to place the forks 138 at their lowermost position adjacent the ground 12. Increasing the distance between the fall block 158 and the support 154 by inclining the truck bed into a horizontal position shortens the available length of the hoist line 144 between the equalizing pulleys 142 and the running block 150. This moves the forks 138 upwards toward the transverse beam 128. During this inclination of the truck bed into a horizontal position, the tension lines 40 maintain the tracks in a vertical position. The center of gravity of the forklift attachment 120, especially if the forks 138 are carrying freight, is rearwardly of the forklift pivot pin 124, a configuration that maintains the tracks vertical and the tension lines 40 taut. The tension in the lift lines 152 also maintains the tracks vertical and the tension lines 40 taut.

If the truck bed 18 can incline into a vertical position, it is a simple matter to mount the forklift attachment 120 onto the truck 10. In this position, the truck and the forklift attachment align with each other, and then the forklift pivot pin 124 secures them together. Next, the free ends of the tension lines 40 fasten to the tracks at the points 132, and the ends of the lift lines 152 fasten to the supports 154.

In use, the forks 138 first are adjacent the ground 12, and then the truck backs up to a load of goods (not shown) that is to be moved and hoisted on top of a stack of goods. After horizontal portions 242 of the forks 138 are underneath the load, the truck bed 18 inclines towards its horizontal position. The inclination continues until the forks are at a level for stacking. Note that the block and tackle arrangement 148 causes the forks to move along the tracks 122 at a rate that is as many times as fast as the running block 150 moving away from the fall block 158 as is the mechanical advantage built into the block and tackle arrangement. After the load has been stacked, the forks lower to pick up another load and move it.

In a somewhat more simplified embodiment of the forklift attachment (not shown), the channel for the forks 138 remains, but there are no dolly and tracks. In place of the tracks, there is a pair of single upright posts. This embodiment likewise pivots to the truck bed 18 at the forklift pivot pin 124, and the pair of tension lines 40 likewise maintains the upright posts in a vertical position irrespective of the position of the truck bed. The functioning of this embodiment is similar to that of the structure shown in FIG. 1, which has a horizontal platform 36. It is better suited than the structure shown in FIG. 1 for moving loads over short distances, such as within a plant, since the horizontal portions 242 of the forks, not connected to the tension lines, can be moved in or out from the center line of the truck, and are therefore adapted to carry loads of widely differing configurations. The forklift attachment of FIGS. 4 and 5 can function like the simplified forklift embodiment if the lift lines 152 are unconnected, so that the dolly remains at its lowermost position, resting on a stop (not shown) at the bottom of the tracks. The advantage of such operation is that the forks can lift a heavier load.

The embodiment of FIG. 1, with the platform 36, and the simplified forklift attachment, or the forklift attachment of FIGS. 4 and 5 operating in the manner described in the preceding sentence, can carry a top-heavy load on its back if the truck bed can incline into a vertical position. For this mode of operation, devices (not shown) fix the relative position of the platform 36 or of the forklift attachment rigidly to the truck bed while the truck bed is in its vertical position. Thereupon, the tension lines 40 become inoperative; the adjusting means 44 automatically reels in the slack whenever the truck bed inclines. Upon inclination of the truck bed towards its horizontal position, the platform, or the pair of forks, swings out of its horizontal position. In the process, the load rotates onto its back, well-supported all of the while, and comes to rest on the truck. The load thereby will not tip while the truck transports it.

What is claimed is:
1. In a truck having a chassis, a bed pivotally mounted near its rear end on the chassis, and means for pivoting the bed from a horizontal position parallel to the chassis into an essentially vertical position, an improvment comprising:
(a) a hoisting member connected with and pivotable relative to the bed;
(b) right and left first guide means respectively mounted on the right and the left sides of the bed forward of the bed's pivot;
(c) right and left second guide means respectively mounted on the right and the left sides of the bed to the rear of the first guide means;
(d) a right tension line engaged with a front point of attachment on the right side of the chassis and extending toward the rear of the trunk for successive engagement with the first right guide means and the second right guide means, the opposite end of the right tension line being secured to a rear point of attachment on the right side of the hoisting member spaced from the hoisting member's pivot; and
(e) a left tension line engaged with a front point of attachment on the left side of the chassis and extending toward the rear of the truck for successive engagement with the first left guide means and the second left guide means, the opposite end of the left tension line being secured to a rear point of attachment on the left side of the hoisting member spaced from the hoisting member's pivot,
whereby inclining the bed about its pivot shortens the tension lines between their respective second guide means and their respective rear points of attachment to compensate for the corresponding lengthening of the tension lines between their respective first guide means and their respective front points of attachment, so that the initial orientation of the hoisting member in the vertical plane remains essentially fixed as the bed inclines from a horizontal position into an essentially vertical position.

2. Apparatus according to claim 1 including tensioning means adapted for engagement with the tension lines for maintaining the tension lines taut regardless of the angular position of the hoisting member relative to its pivot.

3. Apparatus according to claim 2 wherein the tensioning means comprise a left and a right drum each having a periphery in engagement with a respective tension line; and wherein the adjusting means further includes:
   (a) shaft means secured to the chassis for rotatably mounting the drums;
   (b) biasing means for rotationally biasing each drum in a first direction to impart tension onto the lines; and
   (c) stop means for preventing rotation of the drums in a second direction opposite to the first direction under a load imposed upon the ends of the tension lines adjacent the hoisting member when such member is disposed in its working position.

4. Apparatus according to claim 1 wherein the bed extends rearwardly of its pivot a distance substantially equal to the vertical distance between the bed and the ground, and wherein the hoisting member comprises a substantially rectangular platform pivotally secured to the rear end of the bed.

5. Apparatus according to claim 4 wherein the bed defines at its rear a pivotally mounted tailgate, and wherein the platform is pivotally secured to an end of the tailgate remote from the bed; and wherein the truck further includes means for maintaining the tailgate substantially coplanar with the truck bed.

6. Apparatus according to claim 5 including means for disabling the tension lines such that the platform is maintained in a fixed relation relative to the bed while the bed pivots relative to the chassis.

7. Apparatus according to claim 1 wherein the hoisting member comprises a forklift attachment having:
   (a) an upright post pivotally secured to the bed and connected with the ends of the tension line such that the post is maintained in a substantially vertical position during all positions of the bed; and
   (b) a pair of forks mounted to the post and having a horizontal portion extending in a direction away from the bed.

8. Apparatus according to claim 7 including a pair of laterally spaced forks and wherein the spacing between the forks is adjustable.

9. Apparatus according to claim 7 including means for disabling the tension lines such that the position of the upright post remains fixed relative to the bed during pivotal movements of the bed relative to the chassis.

10. Apparatus according to claim 7 wherein the forks are movable vertically relative to the post, and additionally comprising:
    (a) a dolly in engagement with the upright post and movable relative to the post parallel thereto; and
    (b) means for connecting the dolly with the chassis such that the dolly moves relative to the post when the bed is inclined relative to the chassis.

11. Apparatus according to claim 10 additionally comprising a pair of laterally spaced posts that are pivotally connected to the bed, including means for rigidly securing the posts to each other, and wherein the dolly includes wheels engaging the posts.

12. Apparatus according to claim 10 wherein the means for connecting the dolly with the chassis includes a hoist line, a bock and tackle arrangement, and a tension line secured to a running block of the block and tackle arrangement and to the chassis.

References Cited
UNITED STATES PATENTS

| 2,019,451 | 10/1963 | Harm | 214—504 |
|---|---|---|---|
| 2,290,737 | 7/1942 | Chadwick | 214—505 |
| 2,406,620 | 8/1946 | Luckett | 214—501 XR |

ALBERT J. MAKAY, Primary Examiner

U.S. Cl. X.R.

214—77

PO-1050
(5/69)

UNITED STATES PATENT OFFICE
CERTIFICATE OF CORRECTION

Patent No. 3,522,894            Dated Aug. 4, 1970

Inventor(s)       Harold Tornheim

It is certified that error appears in the above-identified patent and that said Letters Patent are hereby corrected as shown below:

Column 2, line 19, "taut in all position of" should read --taut in all positions of--

Column 2, line 32, "the adjusting is locked" should read --the adjusting means is locked--

Column 2, line 44, "when the truck is in-" should read --when the truck bed is in- --

Column 10, Claim 12, line 29, "line, a bock and tackle" should read --line, a block and tackle--

SIGNED AND
SEALED
NOV 3 1970

(SEAL)
Attest:

Edward M. Fletcher, Jr.
Attesting Officer

WILLIAM E. SCHUYLER, JR.
Commissioner of Patents